United States Patent
Park

(10) Patent No.: US 11,338,724 B2
(45) Date of Patent: May 24, 2022

(54) APPARATUS AND METHOD FOR GENERATING ILLUMINANCE INFORMATION OF VEHICLE

(71) Applicants: HYUNDAI MOTOR COMPANY, Seoul (KR); KIA MOTORS CORPORATION, Seoul (KR)

(72) Inventor: Se Young Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/745,800

(22) Filed: Jan. 17, 2020

(65) Prior Publication Data

US 2021/0031676 A1 Feb. 4, 2021

(30) Foreign Application Priority Data

Aug. 2, 2019 (KR) ........................ 10-2019-0094311

(51) Int. Cl.
*B60Q 1/14* (2006.01)
*G06T 7/80* (2017.01)
*B60Q 1/08* (2006.01)

(52) U.S. Cl.
CPC ............. *B60Q 1/143* (2013.01); *B60Q 1/08* (2013.01); *G06T 7/80* (2017.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 9,789,808 | B1* | 10/2017 | Hong | B60Q 1/085 |
| 2004/0143380 | A1* | 7/2004 | Stam | B60Q 1/085 |
| | | | | 701/36 |
| 2009/0072996 | A1* | 3/2009 | Schoepp | B60Q 1/50 |
| | | | | 340/903 |
| 2009/0323366 | A1* | 12/2009 | Furusawa | B60Q 1/143 |
| | | | | 362/466 |
| 2013/0169155 | A1* | 7/2013 | Nakashima | B60Q 1/14 |
| | | | | 315/82 |
| 2017/0332010 | A1* | 11/2017 | Asakura | G05D 1/0223 |
| 2018/0009374 | A1* | 1/2018 | Kim | G03B 21/2013 |
| 2019/0359121 | A1* | 11/2019 | Shimada | B60Q 1/1415 |

* cited by examiner

*Primary Examiner* — Elmito Breval
(74) *Attorney, Agent, or Firm* — Morgan, Lewis & Bockius LLP

(57) ABSTRACT

An apparatus for generating illuminance information of a vehicle and a method thereof are provided. The apparatus for generating illuminance information of a vehicle includes a camera configured to capture an image outside the vehicle, and a controller configured to generate vehicle external illuminance information that is provided for vehicle function control based on brightness of the image.

16 Claims, 9 Drawing Sheets

APPARATUS AND METHOD FOR GENERATING ILLUMINANCE INFORMATION OF VEHICLE

CROSS-REFERENCE TO RELATED APPLICATION

The present application claims priority to and the benefit of Korean Patent Application No. 10-2019-0094311, filed on Aug. 2, 2019, the entire contents of which are incorporated herein by reference.

TECHNICAL FIELD

The present disclosure relates to an apparatus for generating illuminance information of a vehicle and a method thereof.

BACKGROUND

The statements in this section merely provide background information related to the present disclosure and may not constitute prior art.

An illuminance sensor for sensing the amount of external light to be utilized for ON/OFF control of indoor and outdoor lighting, and a photo sensor for sensing the lighting direction of a light source to be used for air conditioning control for each user position are provided in a vehicle. The illuminance and photo sensors are mounted on a top end of a crash pad to sense the brightness of the surroundings of the vehicle. Therefore, because the sensed brightness of light varies depending on the transmittance according to a windshield specification (tint glass, solar glass) or depending on a windshield attachment, it is difficult to control the air conditioning for accurately detecting the lighting direction of a light source when the lighting ON/OFF timing is changed or the light source is behind the vehicle.

In addition, the illuminance sensor senses the brightness of the light source irradiated from the surroundings by using a light receiving diode and converts the brightness of the sensed light into a voltage value. When the converted voltage value does not correspond to the brightness of the actual sensed light due to the sensor internal resistance, it may be inconvenient to constantly change the internal resistance until the converted voltage value is converted to a correct value, so that it may be difficult to trust the detection result of ambient brightness.

SUMMARY

An aspect of the present disclosure provides an apparatus and method for generating illuminance information of a vehicle capable of generating accurate illuminance information even without a sensor for obtaining illuminance information.

According to an aspect of the present disclosure, an apparatus for generating illuminance information of a vehicle includes a camera that obtains an image outside the vehicle, and a controller that generates vehicle external illuminance information provided for vehicle function control based on brightness of the image.

The controller may calculate an average value of brightness measured in a specified area of the image, and generate the vehicle external illuminance information based on the calculated average value.

The controller may use a previously calculated average value to generate the vehicle external illuminance information when the average value has a maximum brightness value that is measurable by the camera.

The controller may determine whether an obstacle is detected outside the vehicle, and use a previously calculated average value to generate the vehicle external illuminance information when the obstacle is detected.

The controller may match the average value with an illuminance value obtained by measuring external illuminance of the vehicle, use the average value matched with the illuminance value to generate the vehicle external illuminance information, and provide the vehicle external illuminance information for lighting control.

The controller may determine a position of a light source based on the brightness of the image measured by the camera, and use the position of the light source to generate the vehicle external illuminance information.

The controller may divide the image into a plurality of areas, divide each area into a plurality of pixels, and calculate a brightness value for each pixel by applying a weight of each area.

The controller may determine the position of the light source based on a position of a pixel which has a largest brightness value calculated for each pixel among the plurality of pixels.

The controller may determine whether an obstacle is detected in an outside of the vehicle, and use the determined position of the light source to generate the vehicle external illuminance information when the obstacle is detected.

The controller may provide the vehicle external illuminance information generated by using the position of the light source for air conditioning control.

According to another aspect of the present disclosure, a method of generating illuminance information of a vehicle includes obtaining an image outside the vehicle, and generating vehicle external illuminance information provided for vehicle function control based on brightness of the image.

The generating of the vehicle external illuminance information may include calculating an average value of brightness measured in a specified area of the image, and generating the vehicle external illuminance information by using the calculated average value.

The vehicle external illuminance information may be generated by using a previously calculated average value when the average value has a maximum brightness value that is measurable by the camera.

The generating of the vehicle external illuminance information may include determining whether an obstacle is detected outside the vehicle, and using a previously calculated average value to generate the vehicle external illuminance information when the obstacle is detected.

The generating of the vehicle external illuminance information may include matching the average value with an illuminance value obtained by measuring external illuminance of the vehicle, and using the average value matched with the illuminance value to generate the vehicle external illuminance information, and the method may further include providing the vehicle external illuminance information for lighting control.

The generating of the vehicle external illuminance information may include determining a position of a light source based on the brightness of the image measured by the camera, and using the position of the light source to generate the vehicle external illuminance information.

The method may further include dividing the image into a plurality of areas, dividing each area into a plurality of pixels, and calculating a brightness value for each pixel by applying a weight of each area.

The determining of the position of the light source may include determining the position of the light source based on a position of a pixel which has a largest brightness value calculated for each pixel among the plurality of pixels.

The generating of the vehicle external illuminance information may include determining whether an obstacle is detected in an outside of the vehicle, and using the determined position of the light source to generate the vehicle external illuminance information when the obstacle is detected.

The method may further include providing the vehicle external illuminance information generated by using the position of the light source for air conditioning control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
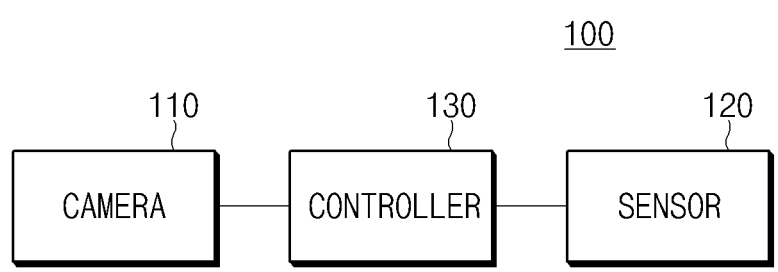
FIG. 1 is a view illustrating a configuration of an illuminance information generating apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of an illuminance information generating apparatus in some forms of the present disclosure.

As illustrated in FIG. 1, an illuminance information generating apparatus 100 of the present disclosure may include a camera 110, a sensor 120, and a controller 130.

The camera 110 may obtain an image outside a vehicle and measure brightness of the image. The camera 110 may include an image sensor and an image processing module, and the image sensor may include at least one of a CMOS and a CCD.

In some forms of the present disclosure, the camera 110 may include an auto exposure camera that normalizes the brightness value of the obtained image to 0 (zero) to 255. For reference, the auto exposure camera may refer to a camera that is controlled to always obtain a standard exposure amount.

The camera 110 may include a front camera for photographing a front image of the vehicle and an around view camera for photographing a surrounding image of the vehicle.

The front camera may be arranged inside the vehicle and may be provided at a position similar to the driver's field of view to face forward of the vehicle. In some forms of the present disclosure, the front camera may be mounted on a room mirror, and may obtain an image by photographing an outside of the vehicle.

The around view camera may be arranged at the front, left and right sides, and the rear of the vehicle. The left camera may be arranged in a case surrounding the left side mirror. Alternatively, the left camera may be arranged outside the case surrounding the left side mirror. Alternatively, the cameras arranged at the left and right sides may be arranged on one area outside the left and right front doors, the left and right rear doors, or the left and right fenders. Meanwhile, the camera arranged in the rear may be arranged near the rear license plate or trunk or tail gate switch. The camera arranged in front may be arranged near the emblem or near the radiator grille.

The sensor 120 may detect an obstacle outside the vehicle, for example, a preceding vehicle traveling in front of the vehicle, a road, a stationary object including a structure installed around the road, and a vehicle approaching from the opposite lane. The sensor 120 of the vehicle in some forms of the present disclosure may include a radar or a light detection and ranging (lidar).

The controller 130 may be implemented with various processing devices, such as a microprocessor incorporating a semiconductor chip that can perform the operation or execution of various commands, and the like, and may control the overall operations of an apparatus for generating illuminance information of a vehicle in some forms of the present disclosure. In some forms of the present disclosure, the controller 130 may perform a function of an illuminance sensor for generating an electrical signal according to a brightness value of an outside of the vehicle based on the brightness of an image measured by the camera 110, and a function of a photo sensor for determining the brightness value of the outside of the vehicle and a position of a light source. Hereinafter, to improve the understanding of the operation of the controller 130 of the present disclosure, it will be described divided into the operation of performing the function of the illuminance sensor and the operation of performing the function of the photo sensor.

First, the operation of the controller 130 for performing the function of the illuminance sensor will be described.

The controller 130 may generate vehicle external illuminance information corresponding to information obtained by the illuminance sensor based on the brightness of an image. To this end, the controller 130 may control the camera 110 such that the camera 110 acquires an image and measures the brightness of the image. In this case, the camera 110 may measure the brightness value of the image by normalizing the brightness to 0 (zero) to 255.

The controller 130 may calculate an average value of the brightness values measured in a specified area of the image obtained through the camera 110 and generate illuminance information by using the calculated brightness average value. In this case, the specified area may mean an area that enables the brightness of the outside of the vehicle to be significantly recognized. In addition, when calculating the average brightness value, the controller 130 may exclude a low area brightness value and a high area brightness value measured in a specified area in the image obtained through the camera 110 in order to improve the accuracy. In this case, the low area brightness value may be in the range of 0 (zero) to 25, and the high area brightness value may be in the range of 230 to 255. In some forms of the present disclosure, the controller 130 may control to measure the brightness of an image obtained from at least two cameras (e.g., a front camera and a rear camera), and may calculate a brightness average value of each image obtained through the at least two cameras.

When an average value is calculated with the maximum brightness value (excluding the upper area brightness value) that can be measured by the camera 110, the controller 130 may determine that a sudden change in illuminance has occurred outside the vehicle. For example, the controller 130 may determine that a sudden change in illuminance occurs outside the vehicle when an external light is close to the vehicle or when the vehicle passes through a tunnel. When the calculated average value has the maximum brightness value that can be measured by the camera 110, the controller 130 may generate illuminance information by using a previously calculated average value. That is, when the calculated average value has the maximum brightness value that can be measured by the camera 110, the controller 130 determines that it is a temporary illuminance change and does not use the calculated average value to generate illuminance information.

The controller 130 determines whether the correct brightness is measured by determining whether an obstacle is detected in an outside of the vehicle. That is, when an obstacle is detected outside the vehicle, because the controller 130 may determine that it is difficult to correctly measure brightness due to light reflection by the obstacle, the brightness value measured by the camera 110 in the state where an obstacle is detected is not used to generate illuminance information, but the previously calculated brightness average value is used to generate illuminance information. Therefore, the controller 130 may allow the brightness average value calculated by using the brightness value measured while any obstacles are not detected to be used to generate the illuminance information.

The controller 130 matches the brightness average value with the illuminance value obtained by measuring the illuminance of the outside of the vehicle, and generates illuminance information using the brightness average value matched with the illuminance value. In this case, the illuminance value may mean a value obtained by measuring the illuminance of the outside of the vehicle with an illuminometer. Because the brightness value measured by the camera 110 is a unitless value, it is difficult to determine how much the average value is actually. Accordingly, the brightness average value calculated by the controller 130 and the actual illuminance value of the outside of the vehicle measured using the illuminometer may match each other, so that it is possible to determine how much the calculated brightness average value is.

When the controller 130 determines which illuminance value is matched with the calculated brightness average value, the controller 130 may determine a brightness average value that is a reference for vehicle lighting ON/OFF control. When the controller 130 determines a brightness average value that is a reference for the vehicle lighting ON/OFF control, the controller 130 may use the same to control the vehicle lighting. Therefore, the controller 130 may provide the illuminance information generated by using the brightness average value matched with the illuminance value when controlling the vehicle lighting.

Next, the operation of the controller 130 for performing the function of the photo sensor will be described.

The controller 130 may generate the vehicle external illuminance information corresponding to the information obtained through the photo sensor based on the brightness of the image. To this end, the controller 130 may control the camera 110 such that the camera 110 acquires an image and measure the brightness of the image. In this case, the camera 110 may measure the brightness value of the image by normalizing the brightness to 0 (zero) to 255.

The controller 130 may determine the position of the light source based on the brightness of the image measured through the camera 110 and generate the illuminance information by using the position of the light source. In this case, the light source may mean the sun.

In more detail, the controller 130 divides the image obtained through the camera 110 into a plurality of areas. In this case, the plurality of areas may include a dashboard area, a horizon lower end area, and a horizon upper end area. The controller 130 may divide the plurality of areas into a plurality of pixels and measure the brightness value for each of the plurality of pixel positions in order to consider the consistency of the brightness values measured through the camera 110.

The controller 130 may set a weight for each of the plurality of areas. The setting of the weights for the plurality of areas by the controller 130 is to prevent the light source from being determined to be located in an area where the actual light source cannot exist. To this end, the controller 130 may set weights of the plurality of areas such that the brightness values of the horizon lower end area and the dashboard area have values smaller than the brightness value of the horizon upper end area. To the contrary, the controller 130 may set the weights of the plurality of areas such that the brightness value of the upper area of the horizon has a value greater than the brightness value of the horizon lower end area and the dashboard.

The controller 130 may calculate the brightness of each pixel position by applying the weights set to the plurality of areas. That is, the controller 130 calculates the brightness value of each pixel position by applying the weight to the measured brightness value of each pixel position.

The controller 130 may determine the position of the light source based on the brightness value of each pixel position calculated by applying the weights. In detail, the controller 130 may determine that the light source is located in an area having the largest brightness value among the brightness values for each pixel position.

The controller 130 determines whether the position of the light source is correctly determined by determining whether an obstacle is detected in the outside of the vehicle. That is, when the obstacle is detected in the outside of the vehicle, because the controller 130 may determine that the brightness is not correctly measured due to the light reflection caused by the obstacle, the position of the light source determined when the obstacle is detected is not used to generate the illuminance information and the position of the light source previously determined is used to generate the illuminance information. Therefore, the controller 130 may allow the position of the light source determined in the state where the obstacle is not detected to be used to generate the illuminance information.

The controller 130 generates the illuminance information by using the position of the light source determined in the state where the obstacle is not detected. When the controller 130 generates illuminance information by using the position of the light source, the controller 130 may utilize the illuminance information in vehicle air conditioning control. For reference, because the vehicle air conditioning is controlled corresponding to the position of the external light source, the vehicle air conditioning may be easily controlled by providing the illuminance information generated by using the position of the light source during the vehicle air conditioning control.

Figure 2:
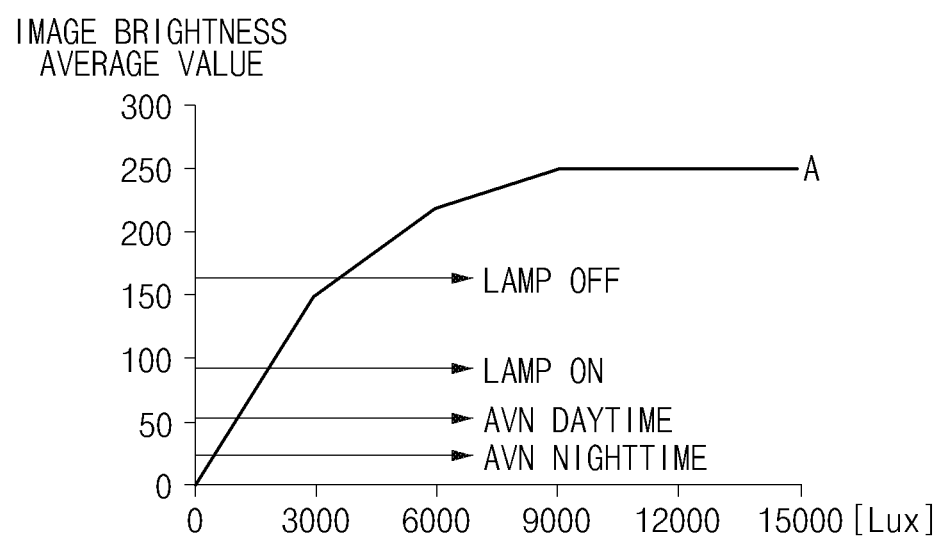
FIG. 2 is a graph in which brightness average values of an image are matched to vehicle external illuminance values in one form of the present disclosure.

FIG. 2 is a graph in which brightness average values of an image are matched to vehicle external illuminance values in some forms of the present disclosure.

As shown in FIG. 2, because the brightness value measured through the camera 110 is a unitless value, the controller 130 may not determine how bright the brightness average value calculated by using the brightness value measured through the camera 110 is. Thus, the controller 130 may determine the brightness degree of the average brightness value by matching the brightness average value with the illuminance value obtained by measuring the external illuminance of the vehicle with the illuminometer.

In the present disclosure, because the camera 110 measures the brightness of the obtained image by normalizing the brightness value between 0 (zero) to 255, the illuminance value (lux) measured by the illuminometer matches the brightness average value within the range of 0 (zero) to 255. In some forms of the present disclosure, the matching result may be represented by line 'A' of FIG. 2. In some forms of the present disclosure, when the illuminance of the outside of the vehicle is 50 lux, an AVN is displayed in a night mode. When the illuminance of the outside of the vehicle is 100 lux, the AVN is displayed in a daytime mode. When the illuminance of the outside of the vehicle is 1500 lux, the lamp is turned on. When the lamp is set to be turned off when the illuminance of the outside of the vehicle is 3000 lux, the controller 130 may determine the average brightness value of the image such as 25, 50, 100, or 150 that match the illuminance of the outside of the vehicle under the above-described conditions, as reference values for controlling vehicle lighting. For example, when the brightness average value of the image obtained through the camera 110 is 25, the controller 130 may determine that the external illuminance of the vehicle is 50 lux, and control the AVN to operate in the night mode. Accordingly, in the present disclosure, the controller 130 may determine a reference value for controlling the vehicle light ON/OFF operation by using the calculated brightness average value, and may use the same to control the vehicle lighting. Therefore, the illuminance information generated by using the brightness average value matched with the illuminance value may be provided in the vehicle lighting control.

Figure 3:
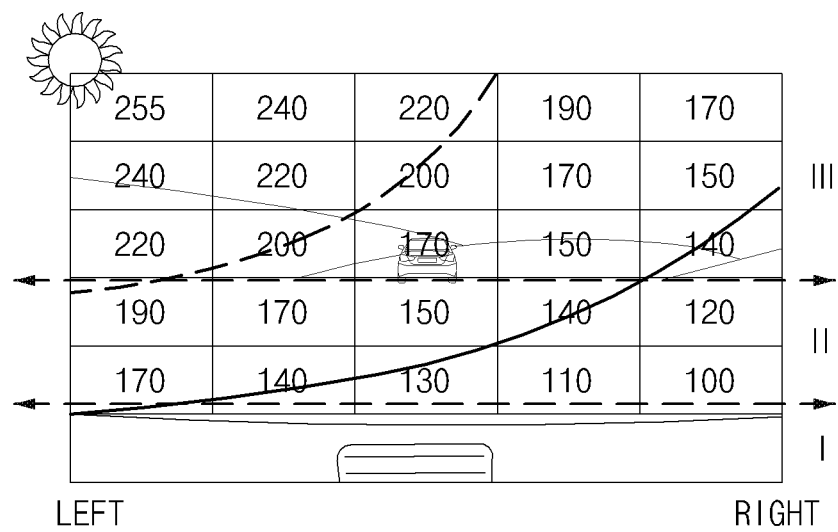
FIG. 3 is a view illustrating a first position of a light source determined in one form of the present disclosure.
Figure 4:
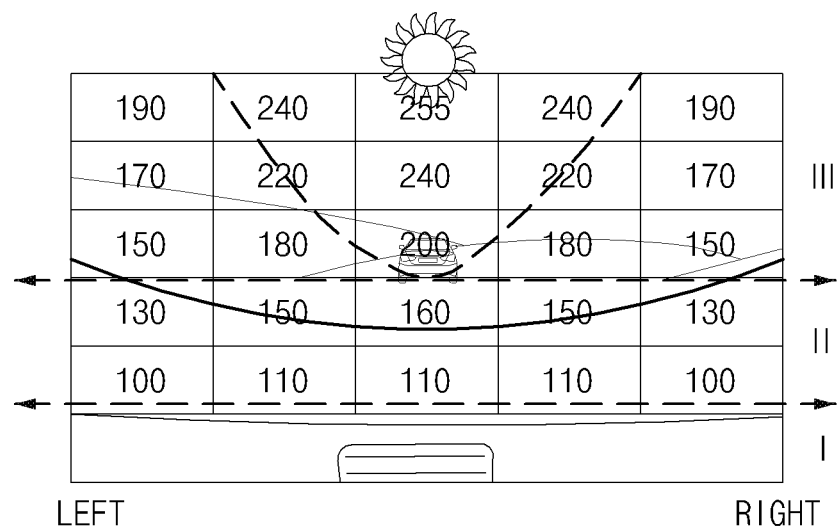
FIG. 4 is a view illustrating a second position of a light source determined in one form of the present disclosure.
Figure 5:
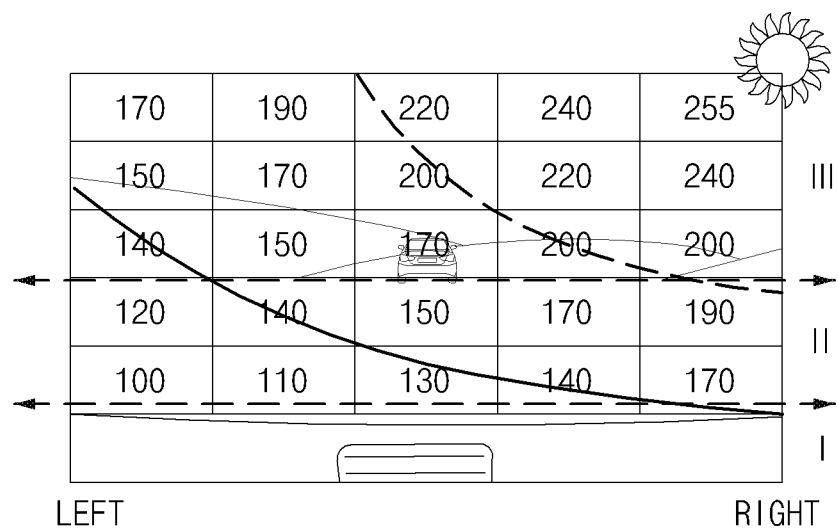
FIG. 5 is a view illustrating a third position of a light source determined in one form of the present disclosure

FIG. 3 is a view illustrating a first position of a light source determined in some forms of the present disclosure. FIG. 4 is a view illustrating a second position of a light source determined in some forms of the present disclosure. FIG. 5 is a view illustrating a third position of a light source determined in some forms of the present disclosure.

As illustrated in FIGS. 3 to 5, in the present disclosure, the controller 130 may generate vehicle external illuminance information corresponding to the information obtained through the photo sensor. To this end, the controller 130 may control the camera 110 to measure the brightness of the obtained image. The camera 110 divides the obtained image into a plurality of areas, and measures the brightness of the image with respect to the plurality of divided areas. In some forms of the present disclosure, the controller 130 may control to divide each of the plurality of areas into a plurality of pixels and to measure the brightness value for each of the plurality of pixel positions in order to consider the consistency of the brightness values measured through the camera 110.

As an example, as illustrated in FIGS. 3 to 5, the controller 130 may divide the image obtained through the camera 110 into a plurality of areas including dashboard area 'I', horizon lower end area 'II', and horizon upper end area 'III', and divide each of the plurality of areas into a plurality of pixels. The controller 130 may set weights for the plurality of areas, respectively and calculate brightness for each pixel position by applying the weights set in the plurality of areas. That is, the controller 130 calculates the brightness value for each pixel position by reflecting the weight on the brightness value measured for each pixel position.

The controller 130 may determine the position of the light source based on the brightness value for each pixel position calculated by reflecting the weight. In detail, the controller 130 may determine that the light source is located in an area having the largest brightness value among the brightness values for each pixel position.

As illustrated in FIG. 3, when the controller 130 determines that the area having the largest brightness value among the brightness values calculated by applying the weights is located on the left upper end, the controller 130 may determine that the light source is located on the left upper end of the vehicle. In addition, as illustrated in FIG. 4, when the controller 130 determines that the area having the largest brightness value among the brightness values calculated by applying the weights is located on the central upper end, the controller 130 may determine that the light source is located on the central upper end of the vehicle. In addition, as illustrated in FIG. 5, when the controller 130 determines that the area having the largest brightness value among the brightness values calculated by applying the weights is located on the right upper end, the controller 130 may determine that the light source is located on the right upper end of the vehicle. In addition, when the position of the light source is determined, the controller 130 may generate the illuminance information by using the determined position of the light source and provide the illumination information to be used for air conditioning control.

Figure 6:
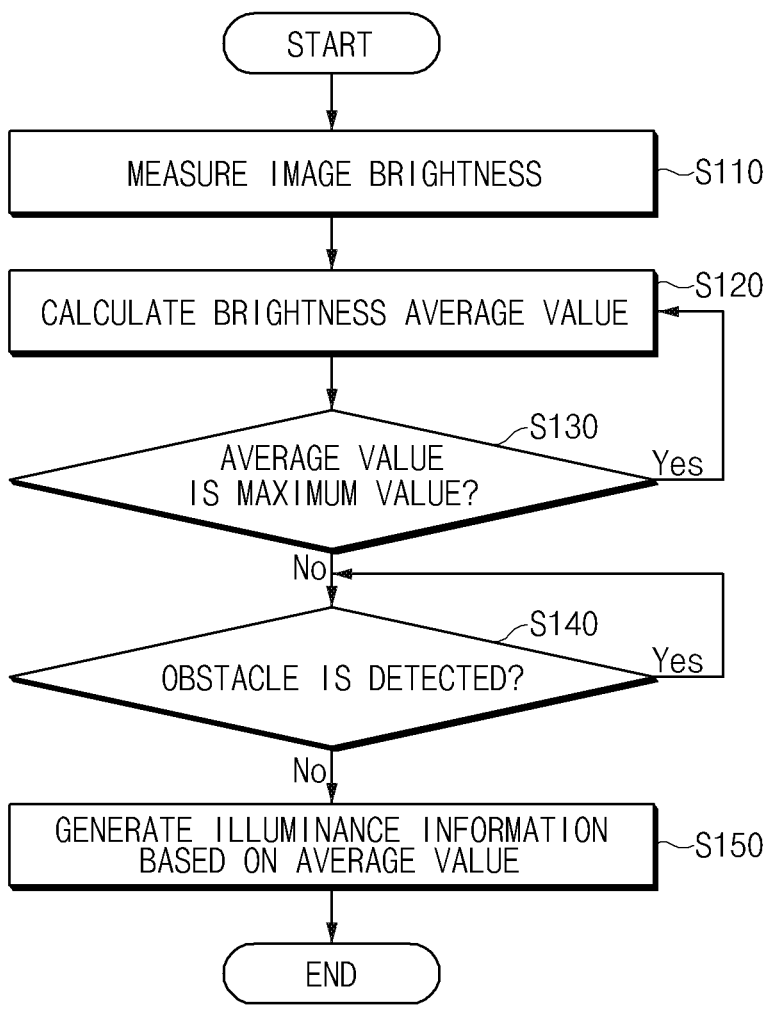
FIG. 6 is a flowchart illustrating a method of generating illuminance information in one form of the present disclosure.

FIG. 6 is a flowchart illustrating a method of generating illuminance information in some forms of the present disclosure.

FIG. 6 illustrates a method by which the controller 130 generates vehicle external illuminance information corresponding to the information obtained through the illuminance sensor based on the brightness of an image.

As illustrated in FIG. 6, in operation S110, the controller 130 controls the camera 110 to acquire an image and to measure the brightness of the image. In operation S110, the camera 110 may normalize and measure the brightness of the image between 0 and 255. In operation S110, the camera 110 may include the brightness of the image obtained through at least two cameras (e.g., the front camera and the rear camera).

In operation S120, the controller 130 calculates the average value of the brightness values measured in the specified area of the image obtained through the camera 110. In this case, the specified area may mean an area in which the brightness of the outside of the vehicle may be significantly recognized. In operation S120, the controller 130 may calculate the brightness average value, excluding a brightness value of a low area and a brightness value of an upper area among the brightness values measured in the specified area in the image obtained through the camera in order to improve accuracy. In this case, the brightness value of the lower area may mean a brightness value of 0 (zero) to 25, and the brightness value of the upper area may mean a brightness value of 230 to 255.

In operation S130, the controller 130 determines whether the brightness average value calculated in operation S120 is the maximum brightness value except for the brightness value of the upper area. In operation S130, the controller 130 may determine whether a sudden change in illuminance occurs outside the vehicle. For example, the controller 130 may determine that a sudden change in illuminance occurs outside the vehicle when an external light is close to the vehicle or when the vehicle passes through a tunnel.

When it is determined in operation S130 that the brightness average value is the maximum brightness value (Y), the controller 130 determines the fact as a temporary change in illuminance and performs operation S120 to prevent the illuminance information from being used to generate the illuminance information. When it is determined in operation S130 that the brightness average value is not the maximum brightness value (N), the controller 130 determines whether an obstacle is detected outside the vehicle in operation S140.

The determination of whether an obstacle is detected outside the vehicle by the controller 130 in operation S140 may be regarded as that the brightness is not correctly measured due to light reflection by the obstacle. This is to prevent the brightness value from being used to generate illuminance information. To this end, when it is determined in operation S140 that the obstacle is detected outside the vehicle (Y), the controller 130 may repeatedly perform an operation of determining whether the obstacle is detected until the obstacle is not detected. When it is determined in operation S140 that the obstacle is not detected outside the vehicle (N), in operation S150, the controller 130 generates the illuminance information based on the average value calculated in operation S120.

In operation S150, the controller 130 may match the brightness average value calculated in operation S120 with the illuminance value obtained by measuring the illuminance of the outside of the vehicle, and generate the illuminance information by using the brightness average value matched with the illuminance value.

Figure 7:
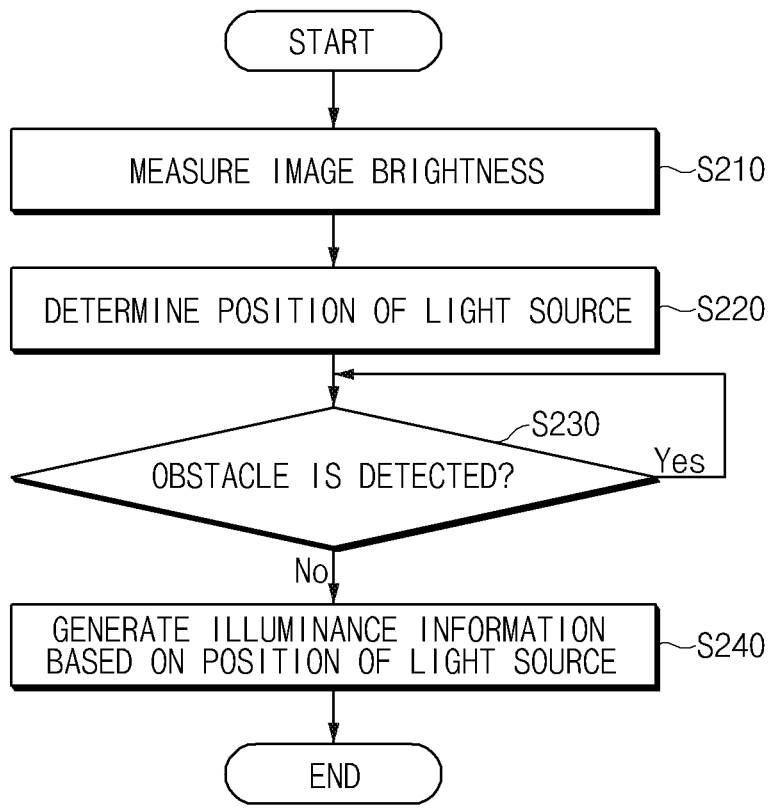
FIG. 7 is a flowchart illustrating a method of generating illuminance information in one form of the present disclosure.

FIG. 7 is a flowchart illustrating a method of generating illuminance information in some forms of the present disclosure.

FIG. 7 illustrates a method by which the controller 130 generates vehicle external illuminance information corresponding to the information obtained through the photo sensor based on the brightness of an image.

As illustrated in FIG. 7, in operation S210, the controller 130 controls the camera 110 to acquire an image and to measure the brightness of the image. In S210, the camera 110 may measure the brightness of the image by normalizing it to 0 to 255. In operation S210, the camera 110 may include the brightness of the image obtained through at least two cameras (e.g., the front camera and the rear camera).

In operation S220, the controller 130 determines the position of the light source based on the brightness of the image measured through the camera 110. The more detailed description of operation S220 refers to FIG. 8.

When the controller 130 determines the position of the light source in operation S220, in operation S230, the controller 130 determines whether an obstacle is detected outside the vehicle. The determination of whether an obstacle is detected outside the vehicle by the controller 130 in operation S230 may be regarded as that the brightness is not correctly measured due to light reflection by the obstacle. This is to prevent the brightness value from being used to generate the illuminance information. To this end, when it is determined in operation S230 that the obstacle is detected outside the vehicle (Y), the controller 130 may repeatedly perform an operation of determining whether the obstacle is detected until the obstacle is not detected. When it is determined in operation S230 that the obstacle is not detected outside the vehicle (N), in operation S240, the controller 130 generates the illuminance information based on the position of the light source determined in operation S220. In operation S240, the controller 130 may provide the illuminance information generated based on the position of the light source determined in operation S220 during vehicle air conditioning control, so that the vehicle air conditioning may be easily controlled.

Figure 8:
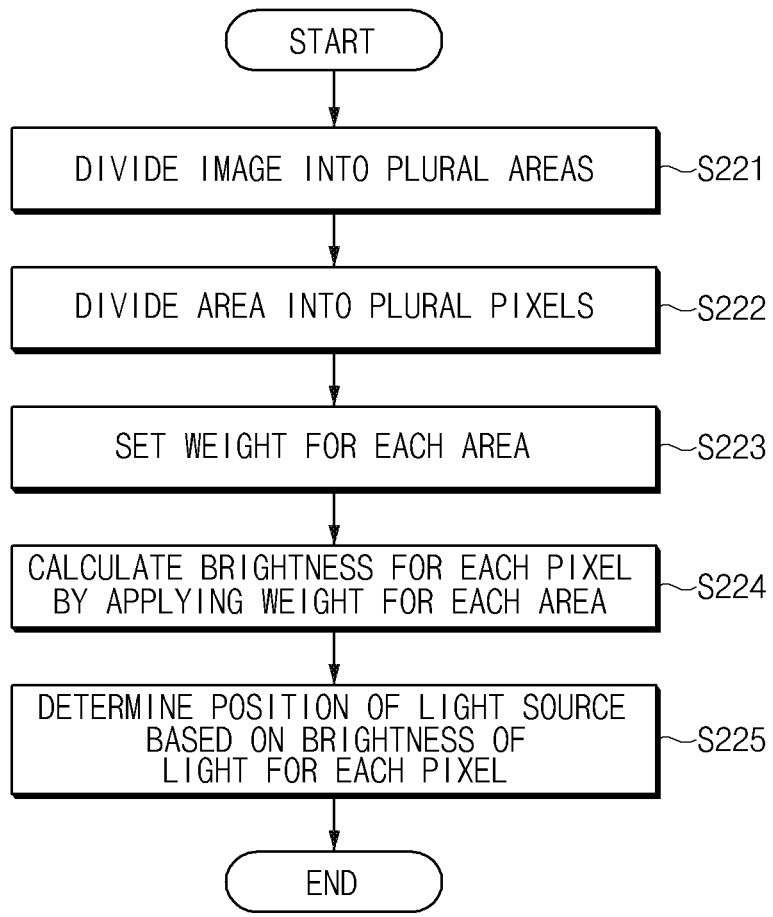
FIG. 8 is a flowchart illustrating a method of determining a position of a light source in one form of the present disclosure.

FIG. 8 is a flowchart illustrating a method of determining a position of a light source in some forms of the present disclosure.

As illustrated in FIG. 8, in operation S221, the controller 130 divides the image obtained through the camera 110 into a plurality of areas. In operation S221, the plurality of areas may include a dashboard area, a horizon lower end area, and a horizon upper end area.

In operation S222, the controller 130 divides the plurality of areas into a plurality of pixels in order to consider the consistency of the brightness measured through the camera 110. In operation S222, the controller 130 may control to measure the brightness value for each of the plurality of pixel positions.

The controller 130 sets a weight for each of the plurality of areas in operation S223, and calculates a brightness value for each pixel position by applying the set weights in operation S224.

In operation S225, the controller 130 determines the position of the light source based on the brightness value for each pixel position calculated by applying the weight. In operation S225, the controller 130 may determine that the light source is located in an area having the largest brightness value among the brightness values for each pixel positions.

Figure 9:
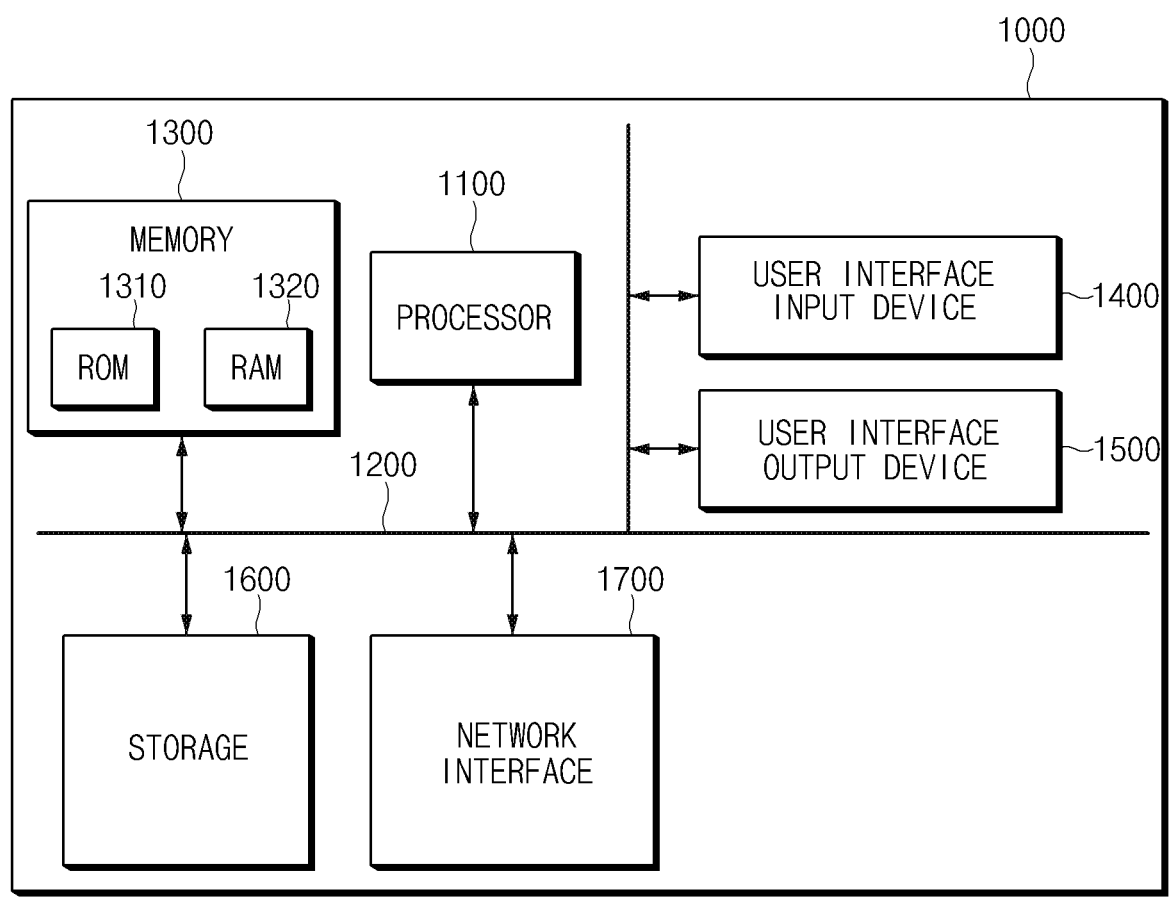
FIG. 9 is a view illustrating a computing system that executes a method in one form of the present disclosure.

FIG. 9 is a view illustrating a computing system that executes a method in some forms of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in some forms of the present disclosure herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the apparatus and method for generating illuminance information of vehicle in some forms of the present disclosure, the external brightness and distribution may be measured at a location similar to the user's field of view to generate accurate illuminance information for vehicle function control.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for generating illuminance information of a vehicle, the apparatus comprising:
    a camera configured to capture an image outside the vehicle; and
    a controller configured to:
        generate external illuminance information of the vehicle that is provided for vehicle function control based on brightness of the image,
        determine a position of a light source based on the brightness of the image; and
        generate the external illuminance information of the vehicle based on the position of the light source,
    wherein the light source includes a light of sun, and
    wherein the controller is configured to provide the generated external illuminance information of the vehicle to control an air conditioning.

2. The apparatus of claim 1, wherein the controller is further configured to:
    calculate an average value of brightness measured in a specified area of the image; and
    generate the external illuminance information of the vehicle based on the calculated average value of brightness.

3. The apparatus of claim 2, wherein the controller is configured to:
    generate the external illuminance information of the vehicle based on a previously calculated average value of brightness when the average value of brightness has a maximum brightness value that is measurable by the camera.

4. The apparatus of claim 2, wherein the controller is configured to:
    determine whether an obstacle is detected outside the vehicle; and
    generate the external illuminance information of the vehicle based on a previously calculated average value of brightness when the obstacle is detected.

5. The apparatus of claim 2, wherein the controller is configured to:
    match the average value of brightness with an illuminance value obtained by measuring external illuminance of the vehicle;
    generate the external illuminance information of the vehicle based on the matched average value of brightness; and
    provide the external illuminance information of the vehicle to control a lighting.

6. The apparatus of claim 1, wherein the controller is configured to:
    divide the image into a plurality of areas;
    divide each area of the plurality of areas into a plurality of pixels; and
    calculate a brightness value for each pixel of the plurality of pixels corresponding to each area of the plurality of areas.

7. The apparatus of claim 1, wherein the controller is configured to:
    determine the position of the light source based on a position of a pixel of a plurality of pixels which has a largest brightness value.

8. The apparatus of claim 1, wherein the controller is configured to:
    determine whether an obstacle is detected outside of the vehicle; and
    generate the external illuminance information of the vehicle based on the determined position of the light source when the obstacle is detected.

9. A method of generating illuminance information of a vehicle, the method comprising:
    capturing, by a camera, an image outside the vehicle; and
    generating, by a controller, external illuminance information of the vehicle that is provided for vehicle function control based on brightness of the image,
    determining, by the controller, a position of a light source based on the brightness of the image;
    generating, by the controller, the external illuminance information of the vehicle based on the position of the light source; and providing, by the controller, the generated external illuminance information of the vehicle to control an air conditioning, wherein the light source includes a light of sun.

10. The method of claim 9, wherein generating the external illuminance information of the vehicle comprises:
calculating, by the controller, an average value of brightness measured in a specified area of the image; and
generating, by the controller, the external illuminance information of the vehicle based on the calculated average value of brightness.

11. The method of claim 10, wherein generating the external illuminance information of the vehicle comprises:
using, by the controller, a previously calculated average value of brightness when the average value of brightness has a maximum brightness value that is measurable by the camera.

12. The method of claim 10, wherein generating the external illuminance information of the vehicle comprises:
determining, by the controller, whether an obstacle is detected outside the vehicle; and
when the obstacle is detected, generating, by the controller, the external illuminance information of the vehicle based on a previously calculated average value of brightness.

13. The method of claim 10, wherein generating the external illuminance information of the vehicle comprises:
matching, by the controller, the average value of brightness with an illuminance value obtained by measuring external illuminance of the vehicle;
generating, by the controller, the external illuminance information of the vehicle based on the matched average value of brightness; and
providing, by the controller, the external illuminance information of the vehicle to control a lighting.

14. The method of claim 9, wherein the method further comprises:
dividing, by the controller, the image into a plurality of areas;
dividing, by the controller, each area of the plurality of areas into a plurality of pixels; and
calculating, by the controller, a brightness value for each pixel of the plurality of pixels corresponding to each area of the plurality of areas.

15. The method of claim 9, wherein determining the position of the light source comprises:
determining, by the controller, the position of the light source based on a position of a pixel of a plurality of pixels which has a largest brightness value.

16. The method of claim 9, wherein generating the external illuminance information of the vehicle comprises:
determining, by the controller, whether an obstacle is detected outside of the vehicle; and
when the obstacle is detected, generating, by the controller, the external illuminance information of the vehicle based on the determined position of the light source.

* * * * *